United States Patent
Zadig

(10) Patent No.: US 6,812,588 B1
(45) Date of Patent: Nov. 2, 2004

(54) WAVE ENERGY CONVERTER

(76) Inventor: Stephen J. Zadig, 652 Melville Ave., Palo Alto, CA (US) 94301

( * ) Notice: Subject to any disclaimer, the term of this patent is extended or adjusted under 35 U.S.C. 154(b) by 0 days.

(21) Appl. No.: 10/690,444

(22) Filed: Oct. 21, 2003

(51) Int. Cl.[7] ............................ F04B 13/10; F04B 35/00
(52) U.S. Cl. ............................ 290/53; 290/54; 417/331
(58) Field of Search .............................. 290/53, 54, 42, 290/43; 417/331; 60/497

(56) References Cited

U.S. PATENT DOCUMENTS

| | | | |
|---|---|---|---|
| 3,362,336 A | | 1/1968 | Kafka |
| 3,515,889 A | | 6/1970 | Kammerer |
| 4,260,901 A | * | 4/1981 | Woodbridge .................. 290/42 |
| 4,441,316 A | * | 4/1984 | Moody ......................... 60/398 |
| 4,598,211 A | * | 7/1986 | Koruthu ...................... 290/53 |
| 4,698,969 A | | 10/1987 | Raichlen |
| 4,754,157 A | * | 6/1988 | Windle ........................ 290/53 |
| 5,186,822 A | | 2/1993 | Tzong |
| 5,842,838 A | * | 12/1998 | Berg .......................... 417/331 |
| 5,975,865 A | * | 11/1999 | Manabe ...................... 417/331 |
| 6,020,653 A | * | 2/2000 | Woodbridge et al. ......... 290/53 |
| 6,574,957 B2 | * | 6/2003 | Brumfield .................... 60/398 |

* cited by examiner

Primary Examiner—Nicholas Ponomarenko
Assistant Examiner—Heba Y. Elkassabgi
(74) Attorney, Agent, or Firm—Gray Cary Ware & Freidenrich LLP

(57) ABSTRACT

An improved wave energy converter for use in offshore and deep-sea locations. The wave energy converter is adapted for secure attachment to the bottom of a body of water (e.g., the ocean floor), preferably beyond the breaker zone. The wave energy converter is selectively adjustable in length. A hydraulic power generation system is used to convert the energy present in the waves into hydraulic power that can be use to generate electricity and for other purposes, such as desalinization. The system may include a hydraulic piston assembly, a floatation device that is connected to the piston assembly, high and low pressure hydraulic reservoirs, and a hydraulically driven power generator. The floatation device moves upward in response to rising waves, and downward under the force of gravity in response to falling waves. The system utilizes this downward gravitational force to discharge fluid from the piston assembly, which in turn, drives the power generator. A control system is used to detect water conditions and to selectively adjust the length of the support structure and the fluid flow characteristics to dynamically optimize power generation based on changing water conditions.

31 Claims, 3 Drawing Sheets

WAVE ENERGY CONVERTER

FIELD OF THE INVENTION

This invention generally relates to a wave energy converter and more particularly, to a wave power generator that utilizes gravity as a primary component in the generation of hydraulic energy, which can be used to generate electrical power, and that is selectively adjustable to optimize power generation based upon water conditions.

BACKGROUND OF THE INVENTION

Waves contain a large amount of energy, which if converted into electricity, can help serve the world's increasing demands for electrical power. Many attempts have been made to harness the energy contained in waves and convert that energy into electrical power. These attempts include shoreline type generators, which are constructed at or near the shoreline, and offshore generators, which are constructed beyond the breaker zone and/or in the deep sea. Shoreline generators are generally easier to construct, but produce less energy than offshore generators, which are able to capture the greater amount of energy available in deeper water.

Although offshore generators may provide a greater amount of energy, they suffer from some drawbacks. For instance, because of the increased size and power of offshore waves, the construction of these devices is more difficult and complex. Furthermore, these devices are typically unable to dynamically adjust their operation to optimize power generation based upon water conditions. Additionally, these devices typically rely only on the rising crests of waves and/or in the resulting changes in pressure to generate electricity, and do not utilize the force of gravity.

It would be desirable to provide an improved wave energy converter that utilizes gravity as a primary component for generating hydraulic energy and is dynamically adjustable to optimize power generation based on current water conditions. The hydraulic power can be used to generate electricity and for other purposes, such as desalination.

SUMMARY OF THE INVENTION

The present invention provides an improved wave energy converter for use in offshore and deep-sea locations. The wave energy converter is adapted for secure attachment to the bottom of a body of water (e.g., the ocean floor), preferably beyond the breaker zone. The wave energy converter is selectively adjustable in length. A hydraulic power generation system is used to convert the energy present in the waves into hydraulic power that can be use to generate electricity and for other purposes, such as desalinization. The system may include a hydraulic piston assembly, a floatation device that is connected to the piston assembly, high and low pressure hydraulic reservoirs, and a hydraulically driven power generator. The floatation device moves upward in response to rising waves, and downward under the force of gravity in response to falling waves. The system utilizes this downward gravitational force to discharge fluid from the piston assembly, which in turn drives the power generator. A control system is used to detect water conditions and to selectively adjust the length of the support structure and the fluid flow characteristics to dynamically optimize power generation based on changing water conditions. The hydraulic energy that is produced can also be used to power other systems and devices, such as a desalination system.

One advantage of the invention is that it provides a wave energy converter that is designed to utilize the force of gravity as a primary component of power generation.

Another advantage of the invention is that it provides a wave energy converter that is selectively and dynamically adjustable to optimize the generation of power based on the current status of wave and/or swell activity.

According to a first aspect of the present invention, a wave energy converter is provided and includes a support structure fixed to a floor of a body of water; a piston assembly including a housing that forms a chamber containing an amount of pressurized fluid and having a first end attached to the support structure and a second end, a piston that is slidably disposed within the chamber, and a piston rod that is attached to the piston and that extends from the second end of the housing; a buoyant floatation device that is attached to the piston rod and that is adapted to cause the piston to move upward in the chamber in response to a rising wave, and to move downward by the force of gravity in response to a falling wave, the downward motion and gravitational force being effective to discharge the pressurized fluid from the chamber; and a hydraulically driven power generator that receives the discharged pressurized fluid from the chamber, and utilizes the pressurized fluid to generate electrical power or for other applications, such as desalination.

According to a second aspect of the present invention, a wave power generator is provided and includes a support structure fixed to a floor of a body of water, the support structure including a pair of telescoping members that are movable relative to each other, effective to adjust a length of the support structure; a hydraulic assembly that is operatively coupled to the support structure and adapted to cause the telescoping members to move relative to each other, thereby adjusting the length of the support structure; a hydraulic piston assembly that is attached to the support structure and that contains an amount of pressurized fluid; a buoyant floatation device that is attached to the hydraulic piston assembly and that is adapted to move upward in response to a rising wave and downward under the force of gravity in response to a falling wave, the downward motion being effective to discharge pressurized fluid from the hydraulic piston assembly; a hydraulically driven power generator that receives the discharged pressurized fluid from the chamber, and utilizes the pressurized fluid to generate electrical power; and a control system that is communicatively coupled to the hydraulic assembly and that is adapted to monitor water conditions and to cause the hydraulic assembly to dynamically adjust the length of the support structure based on the monitored water conditions.

According to a third aspect of the present invention, a method for converting energy from waves formed in a body of water is provided. The method includes steps of: providing a floatation device that is adapted to move upward in response to a rising wave and downward under the force of gravity in response to a falling wave; and utilizing the downward motion and gravitational force of the floatation device to drive fluid through a hydraulically driven power generator, thereby generating electrical power. The floatation device may be attached to a hydraulic piston assembly containing fluid, such that the downward motion of the floatation device actuates the piston assembly, thereby driving the fluid through the hydraulically driven power generator. The piston assembly may be supported at a certain height above a bottom of the body of water. The method may further include the steps of monitoring water conditions; and selectively adjusting the certain height based upon the monitored water conditions; and/or controlling the flow of fluid through the hydraulically driven power generator based upon the monitored water conditions.

These and other aspects, features, and advantages of the present invention will become apparent from a consideration of the following specification and the attached drawings.

DETAILED DESCRIPTION OF THE EMBODIMENTS

The present invention will now be described in detail with reference to the drawings, which are provided as illustrative examples of the invention so as to enable those skilled in the art to practice the invention. Where certain elements of the present invention can be partially or fully implemented using known components, only those portions of such known components that are necessary for an understanding of the present invention will be described, and detailed descriptions of other portions of such known components will be omitted so as not to obscure the invention. Embodiments of the present invention are illustrated in the Figures, like numerals being used to refer to like and corresponding parts of various drawings.

Figure 1:
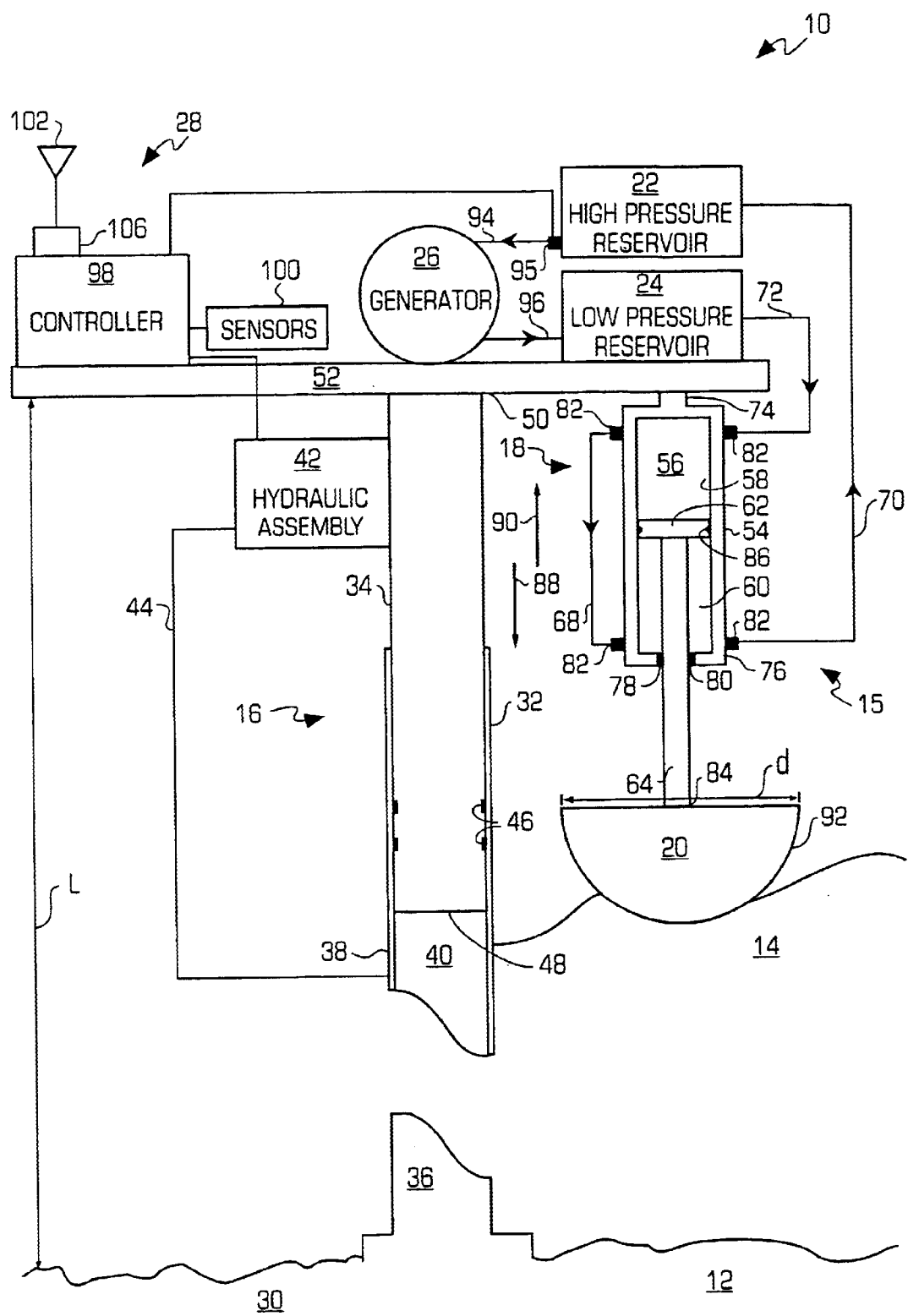
FIG. 1 is a schematic view of a wave power generator, according to the present invention.

Referring now to FIG. 1, there is shown one embodiment of a wave power generator 10 that is made in accordance with present invention and that is adapted for use in offshore and deep-sea locations. Wave power generator 10 is adapted for secure attachment to the bottom or "floor" 12 of a body of water, such as an ocean or sea. The wave power generator 10 is effective to convert the energy present in the waves or swells 14 into electrical power. More specifically, the embodiment shown in FIG. 1 is used to generate hydraulic power, which in turn, runs an electrical power generator. However, in other embodiments, the generated hydraulic power can be used to run other systems or devices, such as a desalination system. It should be appreciated that a power generation system or facility may utilize several wave power generators 10 to collectively generate power in a selected location.

As shown, wave power generator 10 includes a dynamically adjustable support structure 16, a power generation system 15 having a hydraulic piston assembly 18, a floatation device 20, high and low pressure hydraulic reservoirs 22, 24, and a hydraulically driven power generator 26, and a control system 28.

Figure 2:
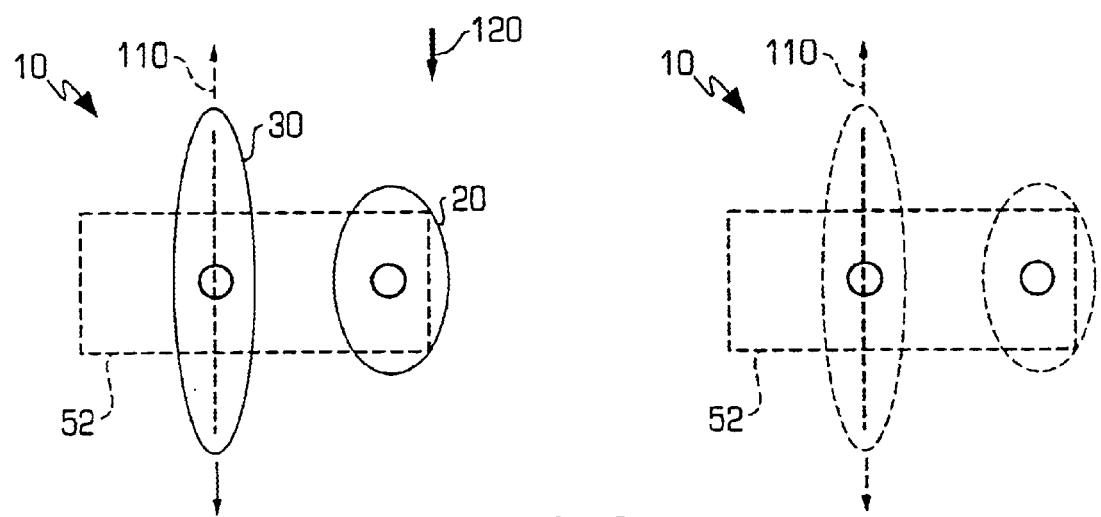
FIG. 2 is a top view of an embodiment of the wave power generator, showing the general shape of the foundation.

Support structure 16 is secured to the ocean floor 12 by use of a foundation 30. Foundation 30 preferably extends a substantial depth below the ocean floor 12 sufficient to hold generator 10 in a fixed position. Foundation 30 may be formed from a conventional durable and dense material, such as reinforced concrete. FIG. 2 is a top view of the generator 10 and illustrates the shape of one embodiment of the foundation 30. Particularly, in the FIG. 2 embodiment, the foundation 30 is generally elliptical in shape and is positioned with its longitudinal axis 110 substantially parallel to the direction of the wave swells 120. This type of shape and positioning will minimize bottom disturbance. However, in other embodiments, the foundation can be made designed to be wider in order to create wave height amplification in areas of lower wave energy. As shown in FIG. 2, additional wave power generators 10 may be grouped in the same general proximity and positioned in the same general direction. In alternate embodiments, structure 16 may be anchored to other structures that are fixedly anchored to the ocean floor, such as drill platforms, piers and other suitable, stable structures. Support structure 16 includes a pair of generally elongated, telescoping members 32, 34. Telescoping members 32, 34 allow the overall length (L) of the support structure 16 (which in this embodiment corresponds to the overall height of the structure 16 above the ocean floor 12) to be selectively adjusted to optimize the power generation process of the generator 10. In the preferred embodiment, member 34 is selectively moved relative to member 32 by use of hydraulic force, as described below. However, in alternate embodiments, the length (L) of the support structure 16 may be adjusted in any other suitable manner.

Member 32 includes a generally solid lower portion 36, which is fixedly attached to foundation 30, and a generally hollow upper portion 38, which slidably receives member 34. Upper portion 38 of member 32 forms an inner chamber 40 that may be filled with pressurized hydraulic fluid, in order to selectively and dynamically raise and lower member 34 relative to member 32. Particularly, a conventional hydraulic assembly 42 may be fluidly coupled to chamber 40 by way of one or more conduits 44. Hydraulic assembly 42 may include one or more reservoirs and electronically actuatable valves (not shown) that cooperate to selectively communicate pressurized hydraulic fluid to and from chamber 40 in a known manner by way of conduit(s) 44. Hydraulic assembly 42 operates under control of control system 28, as discussed more fully and completely below.

Member 34 may include one or more conventional seals 46 that are disposed around the outer circumference of the lower end 48 of member 34. Seals 46 engage the inner surface of member 32 and prevent hydraulic fluid from escaping from chamber 40. A platform 52 may be fixedly attached to the upper end 50 of member 34. Platform 52 may be used to secure various components of the generator 10, such as high and low pressure fluid reservoirs 22, 24, power generator 26, and control system 28.

Figure 3:
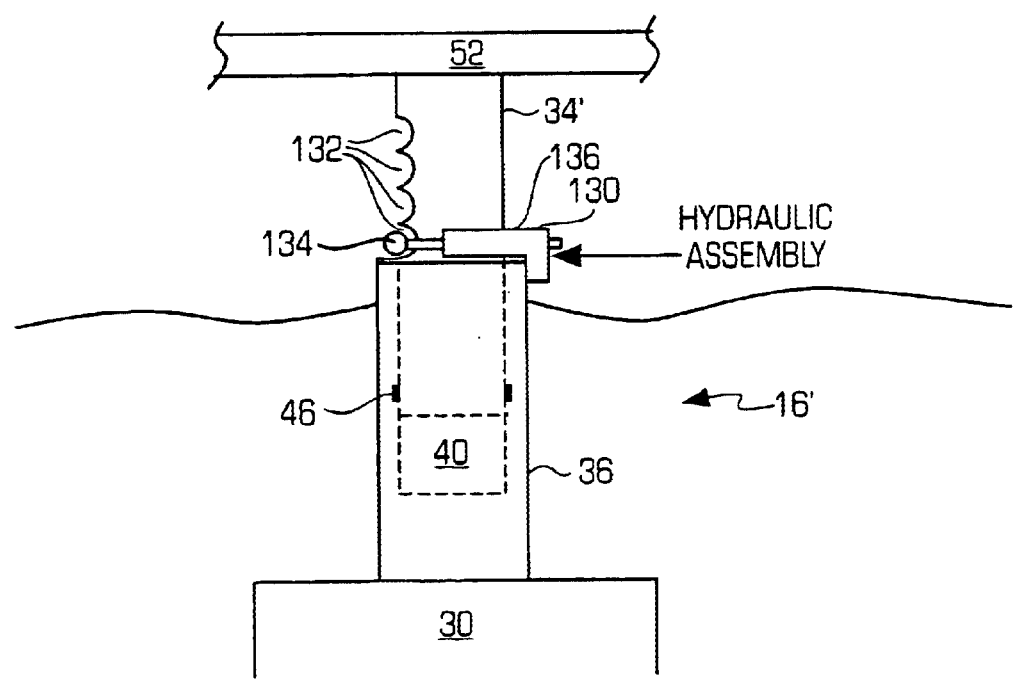
FIG. 3 is a side view of one embodiment of a locking device for use with the wave power generator shown in FIG. 1.

FIG. 3 illustrates one embodiment of a support structure 16' including a selectively actuatable locking mechanism 130. In this embodiment, member 34' includes several concave grooves 132 formed on one side of its outer surface. The locking mechanism 130 includes a locking bar 134 and a spring-loaded hydraulic actuator 136, which is fixedly attached to member 36 and operates by receiving hydraulic pressure from assembly 42. Preferably, the locking mechanism is in a normally closed state (i.e., it is in a fail safe locked position when no pressure is applied to actuator 136), and opens in response to receiving hydraulic pressure. When the mechanism 130 is locked, the bar 134 engages one of grooves 132, thereby preventing the movement of member 34' relative to member 36. When the mechanism 130 is unlocked, bar 134 is clear of member 34', thereby allowing the member to move freely in response to hydraulic pressure.

Hydraulic piston assembly 18 includes a generally cylindrical housing 54 having an interior fluid-containing chamber 56, and a piston 62, which is slidably contained within chamber 56 and which operatively divides chamber 56 into an upper or "charging" chamber 58 and a lower or high pressure chamber 60. A piston rod 64 is attached to and extends downward from piston 62.

Housing 54 is preferably made from a relatively strong durable material, such as a metal material. Housing 54 includes a closed top end 74, which is fixedly attached to the bottom side of platform 52 in a conventional manner. Housing 54 further includes a bottom end 76 having a central aperture 78 through which piston rod 64 slidably moves. A seal 80 is disposed within the aperture 78. Seal 80 sealingly engages the outer surface of piston rod 64, thereby preventing the escape of fluid from chamber 56 through aperture 78. Housing 54 further includes ports 82, which allow chamber 56 to fluidly communicate with conduits 68, 70 and 72.

Conduits 68, 70 and 72 allow pressurized fluid to flow in and out of chamber 56. Conduit 68 fluidly couples the upper chamber 58 to the lower chamber 60. Conduit 70 fluidly couples the lower chamber 60 to the high pressure reservoir 22. Conduit 72 fluidly couples the low pressure reservoir 24 to the upper chamber 58. Each of the conduits may include conventional check and/or flow valves that are designed to control the flow of fluid throughout the system and to prevent backflow.

Piston 62 is generally cylindrical in shape and has a diameter that is substantially identical to the diameter of the interior chamber 56. Piston 62 further includes one or more o-rings 86 that sealingly engage the interior surface of housing portion 54 that defines chamber 56, thereby substantially preventing fluid from flowing "through" or around piston 62. Therefore, when piston 62 moves within chamber 56 in the directions of arrows 88 and 90, all fluid which is transferred between chambers 58 and 60 must flow through conduits 68, 70 and 72. Piston rod 64 includes a bottom end 84, which is fixedly attached to floatation device 20 in a conventional manner, such that the upward and downward movement of floatation device 20 is effective to actuate the piston assembly 18.

Figure 4:
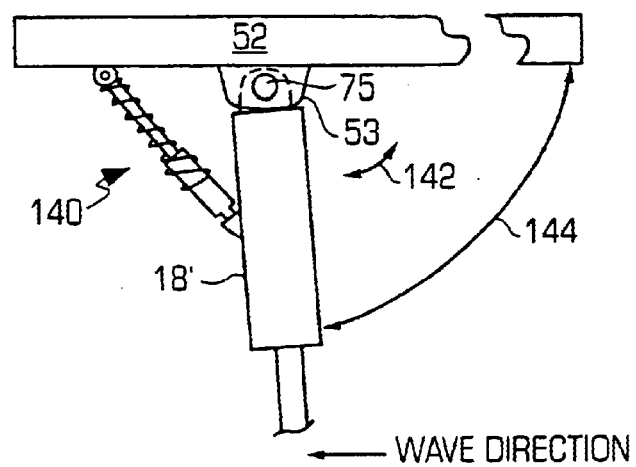
FIG. 4 is a side view of one embodiment of a pivot and damper assembly for connecting a piston to the platform of the generator shown in FIG. 1.

In some embodiments, the piston assembly may be pivotally connected to the main platform and/or to the floatation device 20. FIG. 4 depicts one embodiment where a top end 75 of a piston assembly 18' is pivotally coupled to a bottom portion 53 of platform 52, thereby allowing the assembly 18' to move in the directions of arrows 142. This embodiment further includes a spring-loaded damper 140, which is coupled to platform 52 and to the central area of piston housing 54. Damper 140 may be a conventional preloaded shock absorber device, which is adapted to preposition piston 18' and floatation device 20 in the direction of the oncoming waves, such that piston assembly 18' forms an acute angle 144 with platform 52 toward the oncoming waves. The damper 140 allows piston assembly 18' to pivot in a controlled manner as the wave passes through the generator 10. In this manner, the damper 140 and pivoting piston assembly 18' operate to optimize energy transfer between the wave and generator 10 during the upstroke.

Figure 5:
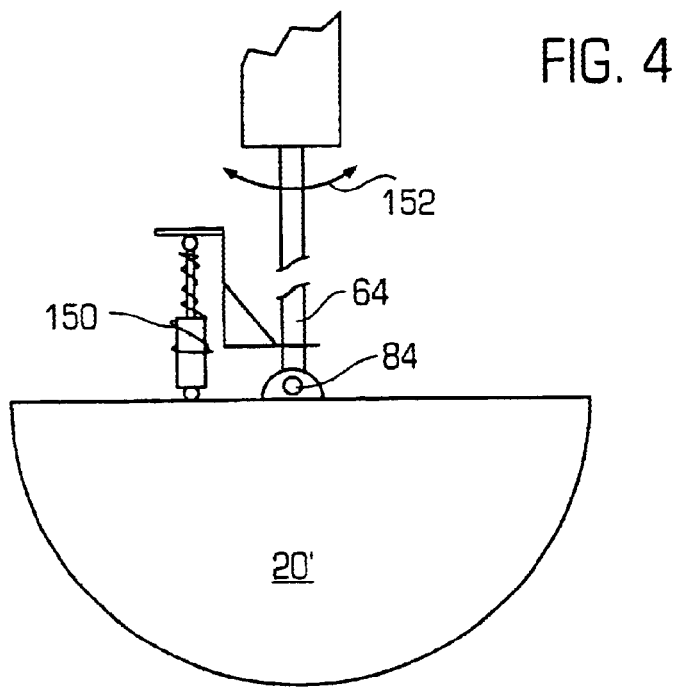
FIG. 5 is a side view of one embodiment of a pivot and damper assembly for connecting a float to the piston assembly of the generator shown in FIG. 1.

FIG. 5 depicts one embodiment where a floatation device 20' is pivotally connected to the bottom end 84 of piston rod 64, thereby allowing the float 20' to pivot in the directions of arrows 152. This embodiment further includes a spring-loaded damper 150, which is coupled to float 20' and to a bracket which is fixedly attached to piston shaft 64. Damper 150 may be a conventional preloaded shock absorber device, which is adapted to minimize the swing of the float to protect shock impacts on the device and assembly. The damper 150 may also preposition the bottom surface of floatation device 20' so that large percentage of the bottom surface area of the device contacts the oncoming waves. The damper 150 will allow float 20' to pivot in a controlled manner as the wave passes through the generator 10. In this manner, the damper 150 and pivoting float 20' operate to optimize energy transfer between the wave and generator 10 during the upstroke.

Floatation device 20 may be generally semi-spherical in shape. Floatation device 20 is made from a buoyant but relatively heavy material. Preferably, floatation device 20 is made as heavy as possible while retaining buoyancy. The rounded or bottom surface 92 of the floatation device 20 engages the surface of the water or waves 14. Floatation device 20 has a preferably large diameter "D", which may be optimized based on the wave shape and height. It should be appreciated that both float size and shape can be optimized by scientific experimentation based on the types of wave fronts typically encountered. The relatively large, rounded surface 92 allows a rising wave front to lift floatation device 20 relatively easily. The relatively heavy weight of floatation device 20 provides a strong gravitational force that pulls floatation device 20 downward and forces pressurized fluid out of chamber 60 during a falling wave.

Figure 6:
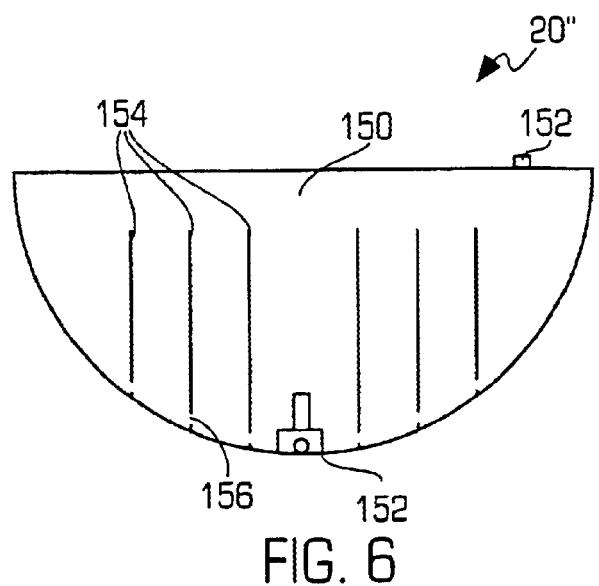
FIG. 6 is a cross-sectional view of one embodiment of a float for use with the generator shown in FIG. 1.

FIG. 6 illustrates one embodiment of a variable weight floatation device 20" for use with generator 10. Float 20" is generally hollow with an inner chamber 150. Several substantially parallel baffles 154 which extend across the chamber 150 and minimize fluid shifting with the chamber 150. The lower ends of the baffles 154 include apertures or vents 156 which allow water to be relatively evenly distributed within chamber 150. The bottom of the float 20" includes an electrically or hydraulically actuated valve 152, which allows water to be selectively added to and removed from the float 20". The float 20" further includes a vent 158 on its top surface that allows for air to be released from chamber 150 to balance the pressure within the float 20" when water is removed or added. In the preferred embodiment, valve 152 is communicatively coupled to a hydraulic or electrical power source (e.g., hydraulic assembly 42 or controller 98), which controls the actuation of the valve 152. By opening the valve 152 when float 20" is in contact with water, water will fill the chamber 150, thereby increasing the weight of the float 20" (e.g., when a heavier float is desirable in certain wave conditions). Furthermore, when the float 20" is raised out of the water, the valve 152 may be opened to release water from the chamber 150, thereby reducing the weight of the float 20" (e.g., when a lighter float is desirable, such as when making a height adjustment in support 16).

In one embodiment, wave power generator 10 may include several hydraulic piston assemblies 18 and floats 20, which are collectively coupled to reservoirs 22 and 24 and cooperate to charge the high pressure reservoir 22, thereby collectively driving generator 26.

High pressure reservoir 22 and low pressure reservoir 24 are conventional hydraulic reservoirs, which are adapted to selectively receive, hold and discharge hydraulic fluid. High pressure reservoir 22 is fluidly coupled to lower chamber 60 by way of conduit 70, and to hydraulic power generator 26 by way of conduit 94. Low pressure reservoir 24 is fluidly coupled to upper chamber 58 by way of conduit 72, and to hydraulic power generator 26 by way of conduit 96. Reservoirs 22, 24 may include conventional electronically controlled flow valves, which control the rate of receipt and/or discharge of hydraulic fluid to/from the reservoirs, such as discharge valve 95, which selectively controls the rate of flow of pressurized hydraulic fluid from high pressure reservoir 22 to generator 26. Such valves may be communicatively coupled to controller 98, and controlled in a conventional manner by use of control system 28.

Power generator 26 is a conventional hydraulically driven electric machine. Power generator 26 includes one or more conventional turbines (not shown), which are adapted to rotate in response to receiving pressurized hydraulic fluid from reservoir 22. The rotating turbine(s) is used to generate electricity in a known and conventional manner. For example, the turbine(s) may be coupled to and/or form a portion of a magnetic rotor assembly having a plurality of poles (e.g., north and south permanent and/or soft magnetic members). The rotor may rotate within or near a conventional stator assembly to produce electrical power. The electrical output of generator 26 may be selectively controlled in a known manner (e.g., by use of one or more field coils, which may be communicatively coupled to control system 28), in order to provide a relatively consistent output voltage or power over a range of operating speeds and temperatures. In alternate embodiments, the power generator 26 may be replaced with other devices that can be driven by pressurized fluid and/or rotary motion, such as a pump, desalination system and/or other mechanical, electrical or electromechanical devices.

In the preferred embodiment, control system 28 includes a controller 98 and a plurality of sensors 100. Controller 98 is communicatively coupled to sensors 100 and to hydraulic assembly 42. Control system 28 may further include an antenna/receiver assembly 102 for receiving electromagnetic transmissions, which may provide information for controlling the operation of wave power generator 10. In the preferred embodiment, controller 98 may comprise a conventional microprocessor-based controller operating under stored program control. As discussed in greater detail below, controller 98 receives signals generated by sensors 100 and antenna/receiver 102 and utilizes the received signals to determine the optimal fluid flow characteristics for the power generation system 15 and an optimal length (L) for the support structure 16 in order to provide for optimal power generation. Based upon these determinations, controller 98 may generate command signals to selectively activate the flow valves within power generation system 15 (e.g., valve 95) and the hydraulic assembly 42 to cause support structure 16 to adjust to the optimal length (L). Controller 98 may also be adapted to detect when wave conditions are such that continued operation may damage the power generation system 15. Controller 98 may cause support structure 16 to rise so that piston assembly 18 and floatation device 20 are not impacted by the waves.

Sensors 100 comprise conventional and commercially available sensors, which are adapted to sense wave and water level conditions. For example, sensors 100 may comprise one or more pressure sensors that are attached to support structure 16 at some point below the water surface. The pressure sensors may be adapted to sense changes in pressure based on the water level (e.g., when the water level is high, the sensors will sense an increased pressure). Sensors 100 may alternatively comprise an array of moisture sensors. The moisture sensors may be adapted to detect when locations along support structure 16 become submerged. In either case, the data provided by sensors 100 allows controller 98 to determine water conditions such as tidal levels or conditions (e.g., average depth of water), wave/swell height (e.g., the distance from wave peak to trough), and wave frequency.

Antenna/receiver unit 102 comprises a conventional antenna 104 for receiving electromagnetic signals and a receiver 106 for amplifying and/or processing the signals, and communicating the signals to controller 98. The signals may include conventional weather broadcasts and marine advisories which may provide data describing weather, water, wave and tidal conditions. The data may be processed in a conventional manner by controller 98 and used to determine an optimal length (L) for structure 16 and/or optimal fluid flow characteristics for the hydraulic assembly 15, based on expected water conditions.

In operation, the wave power generator 10 is preferably disposed in an offshore location where ocean waves/swells carry substantially more energy. For instance, the wave power generator 10 may be operatively disposed beyond the just beyond breaker zone and/or in the deep sea at a relatively high latitude location. However, it should be appreciated that the wave power generator 10 can also function and produce desirable levels of electricity in other locations. As the flotation device 20 rides an upward wave swell, fluid is exchanged with low resistance between the upper charging chamber 58 and the lower charging chamber 60 through conduit 68. As the wave 14 begins to fall, the force of gravity acts on the relatively heavy floatation device 20, pulling the piston 62 downward. The downward motion and gravitational force causes the piston 66 to pressurize the fluid within chamber 60 and to displace the pressurized fluid into high pressure reservoir 22 by way of conduit 70. In one embodiment, the displacement pressure created by the downward moving piston 62 may be approximately 1,000–1,500 psi. This pressure may be adjusted based on the size, weight and shapes of the components of the piston assembly 18 and floatation device 20. During the down stroke, substantially all of the fluid is displaced into the high pressure reservoir 22. Pressurized fluid is then discharged from reservoir 22 into the hydraulically driven power generator 26, where it is channeled through one or more turbines. The resulting rotation of the turbine(s) is used to create electrical power, in the manner described above. Controller 98 may selectively control the discharge vale 95 to ensure that fluid is discharged from the reservoir 22 to the power generator 26 at a rate and pressure that allows the turbine to rotate continuously between swells. After the fluid passes through generator 26, it is communicated to the low pressure reservoir 24 by way of conduit 96. Low pressure reservoir 24 holds the charging fluid during the down stroke and allows for pressure bleed off.

Controller 98 may monitor sensors 100 and/or data from antenna/receiver unit 102 to determine the optimal amount of fluid pressure and/or discharge rate to be provided to the generator 26. Controller 98 may communicate control signals to valve 95, effective to control the rate at which fluid is discharged from reservoir 22 to generator 26. For example, in relatively strong wave conditions (e.g., when sensors 100 detect a relatively large wave peak to trough distance), controller 98 and valve 95 may cooperatively cause a higher rate of fluid discharge to the power generator 26, since the compression stroke of the piston assembly 18 will be larger and provide a greater amount of displaced pressurized fluid. At relatively low wave conditions (e.g., when sensors 100 detect a relatively small wave peak to trough distance), controller 98 and valve 95 cooperatively may cause a lower rate of fuel discharge to the power generator 26 in order to keep the turbine(s) within the power generator 26 continuously rotating, since a lesser amount of fluid may be displaced in the system. Additionally, the controller 98 may control other valves within the hydraulic assembly 15 in order to selectively increase and decrease the ability of fluid to flow throughout the assembly 15 based on water conditions to achieve certain electrical output characteristics.

Controller 98 will also monitor sensors 100 and/or unit 102 for tidal levels, swell heights and wave frequency to determine an optimal length (L) for the support structure 16. Particularly, controller 98 monitors sensors 100 and/or data from unit 102 over predetermined periods of time to determine the average water levels during wave peaks and troughs. Based on these average "high" and "low" water levels, controller 98 will communicate signals to hydraulic assembly 42, effective to adjust the length (L) of support structure 16 so that the piston assembly 18 will have a full range of stroke. For example, during a wave peak, the piston 62 should preferably reach near the top of the cylinder 54, and during a wave trough, the piston 62 should preferably reach near the bottom of the cylinder 54, such that substantially all fluid in the cylinder is displaced. These "preferred" positions, and consequently length (L), may change based on wave height and frequency. Additionally, different positions may be chosen based on water conditions in to achieve different operational characteristics.

Controller 98 may also detect when water conditions are such that continued operation may damage the power generation system 15 (e.g., during heavy waves, storms or violent weather occurrences) by monitoring sensors 100 and/or weather data from unit 102. In these situations, controller 98 signals hydraulic assembly 42 to cause support structure 16 to rise so that piston assembly 18 and floatation device 20 are at a safe height (e.g., not impacted by waves).

It should therefore be appreciated that the wave power generator 10 provides an improved wave power generator that utilizes gravitational force (e.g., the substantial gravitational force produced by the falling floatation device 20) as a primary component in a power generation process. Furthermore, the control system 28 allows the operation of wave power generator 10 to be selectively and dynamically adjusted to optimize the power generation process based on the current status of wave and/or swell activity.

It is understood that the invention is not limited by the exact construction or method illustrated and described above but that various changes and/or modifications may be made without departing from the spirit and/or the scope of Applicants' inventions.

What is claimed is:

1. A wave energy converter comprising:
   a support structure fixed to a floor of a body of water;
   a piston assembly including a housing that forms a chamber containing an amount of pressurized fluid and having a first end attached to the support structure and a second end, a piston that is slidably disposed within the chamber, and a piston rod that is attached to the piston and that extends from the second end of the housing;
   a floatation device that is attached to the piston rod and that is adapted to cause the piston to move upward in the chamber in response to a rising wave, and to move downward by the force of gravity in response to a falling wave, the downward motion and gravitational force being effective to discharge the pressurized fluid from the chamber;
   at least one reservoir that is fluidly coupled to the piston assembly and that receives and stores the pressurized fluid;
   a hydraulically driven power generator that is fluidly coupled to the at least one reservoir and that receives and utilizes the pressurized fluid to generate electrical power; and
   a control system that is adapted to monitor water conditions and to control operation of the wave energy converter based upon the monitored water conditions by selectively controlling a flow of the pressurized fluid in the wave energy converter.

2. The wave energy converter of claim 1 wherein the at least one reservoir comprises:
   a high pressure reservoir that is adapted to receive fluid from the piston assembly, and to communicate the fluid to the hydraulically driven power generator at a certain flow rate.

3. The wave energy converter of claim 2 wherein the high pressure reservoir includes an adjustable valve that is coupled to the control system and that is adapted to control the certain flow rate.

4. The wave energy converter of claim 2 further comprising:
   a low pressure reservoir that is fluidly coupled to the hydraulically driven power generator and to the piston assembly, the low pressure reservoir being adapted to receive fluid from the hydraulically driven power generator.

5. The wave energy converter of claim 4 wherein the piston divides the chamber into a charging chamber and a high pressure chamber, and wherein the piston assembly further comprises a conduit which fluidly couples the charging chamber to the high pressure chamber, thereby allowing fluid to be communicated from the charging chamber to the high pressure chamber as the piston moves upward in the chamber.

6. The wave energy converter of claim 1 wherein the support structure selectively adjustable in length.

7. The wave energy converter of claim 6 wherein the control system is further adapted to selectively adjust a length of the support structure based upon the monitored water conditions.

8. The wave energy converter of claim 7 wherein the control system comprises a hydraulic assembly adapted to selectively adjust the length of the support structure.

9. The wave energy converter of claim 8 wherein the support structure comprises first and second telescoping members that are selectively moved relative to one another by use of the hydraulic assembly.

10. The wave energy converter of claim 1 wherein the control system is adapted to control the flow of pressurized fluid through the hydraulically driven power generator based upon the monitored water conditions.

11. The wave energy converter of claim 1 wherein the control system is adapted to monitor water conditions by use of at least one sensor that is attached to the support structure.

12. The wave energy converter of claim 11 wherein the at least one sensor comprises a pressure sensor.

13. The wave energy converter of claim 11 wherein the at least one sensor comprises a moisture sensor.

14. The wave energy converter of claim 1 wherein the control system is adapted to monitor wave conditions by use of an antenna/receiver unit that is adapted to receive whether data and provide the received weather data to the control system.

15. The wave energy converter of claim 1 wherein the first end of the piston assembly is pivotally attached to the support structure.

16. The wave energy converter of claim 15 further comprising a damper that is coupled to the piston assembly and to the support structure and that is effective to damp pivoting movement of the piston assembly relative to the support structure.

17. The wave energy converter of claim 1 wherein the floatation device is pivotally attached to the piston rod.

18. The wave energy converter of claim 17 further comprising a damper that is coupled to the piston rod and to the floatation device and that is effective to damp pivoting movement of the floatation device relative to the piston rod.

19. The wave energy converter of claim 1 wherein the support structure includes a generally elliptical foundation having a longitudinal axis positioned substantially parallel to the direction of wave fronts.

20. A wave power generator comprising:
   a support structure fixed to a floor of a body of water, the support structure including a pair of telescoping members that are movable relative to each other, effective to adjust a length of the support structure;
   a hydraulic assembly that is operatively coupled to the support structure and adapted to cause the telescoping members to move relative to one another, thereby adjusting the length of the support structure;
   a hydraulic piston assembly that is attached to the support structure and that contains an amount of pressurized fluid;
   a floatation device that is attached to the hydraulic piston assembly and that is adapted to move upward in response to a rising wave and downward under the force of gravity in response to a falling wave, the downward motion being effective to discharge pressurized fluid from the hydraulic piston assembly;
   a hydraulically driven power generator that receives the discharged pressurized fluid from the chamber, and utilizes the pressurized fluid to generate electrical power; and
   a control system that is communicatively coupled to the hydraulic assembly and that is adapted to monitor water conditions and to cause the hydraulic assembly to dynamically adjust the length of the support structure based on the monitored water conditions.

21. The wave power generator of claim 20 further comprising:
   a high pressure reservoir that is fluidly coupled to the piston assembly and to the hydraulically driven power generator, the high pressure reservoir being adapted to receive fluid from the piston assembly, and to communicate the fluid to the hydraulically driven power generator at a certain flow rate.

22. The wave power generator of claim 21 wherein the high pressure reservoir includes an adjustable valve that is communicatively coupled to the control system, wherein the control system is further adapted to communicate signals to the valve, effective to control the flow of pressurized fluid through the hydraulically driven power generator based upon the monitored water conditions.

23. The wave power generator of claim 21 further comprising:
   a low pressure reservoir that is fluidly coupled to the hydraulically driven power generator and to the piston assembly, the low pressure reservoir being adapted to receive fluid from the hydraulically driven power generator.

24. The wave power generator of claim 23 wherein the piston divides the chamber into a charging chamber and a high pressure chamber, and wherein the piston assembly further comprises a conduit which fluidly couples the charging chamber to the high pressure chamber, thereby allowing fluid to be communicated from the charging chamber to the high pressure chamber as the piston moves upward in the chamber.

25. The wave power generator of claim 20 wherein the control system is adapted to monitor water conditions by use of at least one sensor that is attached to the support structure.

26. The wave power generator of claim 25 wherein the at least one sensor comprises a pressure sensor.

27. The wave power generator of claim 25 wherein the at least one sensor comprises a moisture sensor.

28. The wave power generator of claim 25 wherein the control system is adapted to monitor wave conditions by use of an antenna/receiver unit that is adapted to receive whether data and provide the received weather data to the control system.

29. A method for generating electrical power from waves in a body of water, comprising:
   providing a floatation device that is adapted to move upward in response to a rising wave and downward under the force of gravity in response to a falling wave;
   utilizing the downward motion and gravitational force of the floatation device to drive fluid through a hydraulically driven power generator, thereby generating electrical power;
   monitoring water conditions; and
   automatically controlling electrical power generation based on the monitored water conditions by selectively controlling a flow rate of the fluid through the hydraulically driven power generator.

30. The method of claim 29, further comprising:
   providing a hydraulic piston assembly containing fluid;
   supporting the hydraulic piston assembly at a certain height above a bottom of the body of water; and
   attaching the floatation device to the piston assembly, such that the downward motion of the floatation device actuates the piston assembly, thereby driving the fluid through the hydraulically driven power generator.

31. The method of claim 30 further comprising:
   automatically adjusting the certain height based upon the monitored water conditions.

* * * * *